(12) United States Patent
Wang et al.

(10) Patent No.: US 12,315,945 B2
(45) Date of Patent: May 27, 2025

(54) BATTERY, ELECTRIC APPARATUS, AND MANUFACTURING METHOD OF BATTERY

(71) Applicant: JIANGSU CONTEMPORARY AMPEREX TECHNOLOGY LIMITED, Liyang (CN)

(72) Inventors: Yongguang Wang, Liyang (CN); Peng Wang, Liyang (CN); Feng Qin, Liyang (CN); Jinqing Ji, Liyang (CN); Mu Qian, Liyang (CN)

(73) Assignee: JIANGSU CONTEMPORARY AMPEREX TECHNOLOGY LIMITED, Liyang (CN)

( * ) Notice: Subject to any disclaimer, the term of this patent is extended or adjusted under 35 U.S.C. 154(b) by 710 days.

(21) Appl. No.: 17/563,515

(22) Filed: Dec. 28, 2021

(65) Prior Publication Data
US 2022/0173468 A1    Jun. 2, 2022

Related U.S. Application Data

(63) Continuation of application No. PCT/CN2021/091333, filed on Apr. 30, 2021.

(30) Foreign Application Priority Data

Dec. 1, 2020 (CN) .......................... 202011377701.9

(51) Int. Cl.
*H01M 50/204* (2021.01)
*H01M 10/0525* (2010.01)
(Continued)

(52) U.S. Cl.
CPC ..... *H01M 50/204* (2021.01); *H01M 10/0525* (2013.01); *H01M 10/615* (2015.04);
(Continued)

(58) Field of Classification Search
None
See application file for complete search history.

(56) References Cited

U.S. PATENT DOCUMENTS

2012/0301762 A1    11/2012    Welker et al.
2020/0243814 A1     7/2020    Kang et al.

FOREIGN PATENT DOCUMENTS

CN      205488273 U    8/2016
CN      205609613 U    9/2016
(Continued)

OTHER PUBLICATIONS

Machine translation of Chinese Patent Publication No. CN106785215 (Year: 2017).*

(Continued)

*Primary Examiner* — Wyatt P McConnell
(74) *Attorney, Agent, or Firm* — Scully, Scott, Murphy & Preseer, P.C.

(57) ABSTRACT

Disclosed are a battery, an electric apparatus, and a manufacturing method of the battery, belonging to the technical field of batteries. The battery includes a plurality of battery cells and a mounting base, where the plurality of battery cells are electrically connected; the mounting base is used to fix an output electrode of the battery, the output electrode is used to export electric energy of the plurality of battery cells, the mounting base includes at least one limiting surface, and the limiting surface is matched with the contour of the battery cell. Through the battery, the electric apparatus, and the manufacturing method of the battery, the occupied space of the mounting base is reduced, and the energy density of the battery is increased.

14 Claims, 11 Drawing Sheets

(51) Int. Cl.
  *H01M 10/615* (2014.01)
  *H01M 10/625* (2014.01)
  *H01M 10/655* (2014.01)
  *H01M 50/249* (2021.01)
  *H01M 50/289* (2021.01)

(52) U.S. Cl.
  CPC ....... *H01M 10/625* (2015.04); *H01M 10/655* (2015.04); *H01M 50/249* (2021.01); *H01M 50/289* (2021.01); *H01M 2220/20* (2013.01)

(56) References Cited

FOREIGN PATENT DOCUMENTS

| | | |
|---|---|---|
| CN | 106785215 A | 5/2017 |
| CN | 107154478 A | 9/2017 |
| CN | 107425165 A | 12/2017 |
| CN | 108198983 A | 6/2018 |
| CN | 108258168 A | 7/2018 |
| CN | 111952515 A | 11/2020 |
| CN | 112259872 A | 1/2021 |
| EP | 3686953 A1 | 7/2020 |

OTHER PUBLICATIONS

First Office Action dated Nov. 28, 2022 received in Chinese Patent Application No. CN 202110485148.9.
Extended European Search Report dated Sep. 28, 2022 received in European Patent Application No. EP 21820074.9.

* cited by examiner

BATTERY, ELECTRIC APPARATUS, AND MANUFACTURING METHOD OF BATTERY

CROSS-REFERENCE TO RELATED APPLICATION

This application is a continuation of International Application No. PCT/CN2021/091333, filed on Apr. 30, 2021, which claims priority to Chinese Patent Application No. CN202011377701.9, filed on Dec. 1, 2020. The disclosures of the aforementioned applications are hereby incorporated by reference in their entireties.

TECHNICAL FIELD

The present application relates to the technical field of batteries, and in particular to a battery, an electric apparatus, and a manufacturing method of a battery.

BACKGROUND

In related art, a mounting base of an output electrode of a battery is generally mounted on an end plate of the battery. In this way, the mounting base of the output electrode will occupy a certain internal space of the battery, thereby affecting the energy density of the battery.

SUMMARY

An objective of the present application provides a battery, an electric apparatus, and a manufacturing method of a battery, so as to reduce the space occupied by the mounting base and increase the energy density of the battery.

The present application is implemented by the following technical solution:

In a first aspect, the present application provides a battery, including:

a plurality of battery cells, the plurality of battery cells being electrically connected;

an output electrode, used to export electric energy of the plurality of battery cells; and a mounting base, used to fix the output electrode of the battery, the mounting base including at least one limiting surface, and the limiting surface being matched with the contour of the battery cell.

Through matching between the limiting surface and the contour of the battery cell, the battery cell supports the mounting base, so that the battery cell bears a torque force generated when the output electrode is fixed on the mounting base, the space occupied by the mounting base is reduced, and the energy density of the battery is increased. Through the matching between the limiting surface and the battery cell, the mounting base is mounted on the battery cell, so that mounting positioning of the mounting base and the battery cell is realized, and the space can be saved.

In some embodiments of the present application, the limiting surface is used to be attached to an external peripheral surface of the battery cell.

In the above implementation solution, the limiting surface is attached to the external peripheral surface of the battery cell, a relative displacement of the mounting base and the battery cell can be reduced, which makes the torque force generated when the output electrode is fixed on the mounting base being applied to the battery cell much easier.

In some embodiments of the present application, the mounting base includes a plurality of limiting surfaces, and the plurality of limiting surface are used to be attached to external peripheral surfaces of the plurality of battery cells.

In the above implementation solution, the plurality of limiting surfaces are attached to the external peripheral surfaces of the plurality of battery cells, the mounting positioning surface of the mounting base is increased, and the mounting strength of the mounting base is improved.

In some embodiments of the present application, the mounting base includes a hole, and the hole is used to be sleeved on an external peripheral surface of the battery cell.

In the above implementation solution, on one hand, the hole is sleeved on the external peripheral surface of the battery cell, so that the mounting positioning of the mounting base is facilitated; and on another hand, the above solution can facilitate the mounting base transmitting the torque force to the battery cell.

In some embodiments of the present application, the mounting base includes two holes, and the two holes are used to be sleeved on the external peripheral surfaces of the two battery cells respectively.

In the above implementation solution, the two holes are respectively sleeved on the external peripheral surfaces of the two battery cells, so that the ability of the battery cell of resisting the torque force generated when the output electrode is fixed on the mounting base can be improved, and at the same time, the rotations of the mounting base relative to the battery cell can be limited.

In some embodiments of the present application, the mounting base is configured to be mounted on at least one of the plurality of battery cells.

The mounting base is mounted on the battery cell, and the battery cell supports the mounting base, so that the battery cell bears the torque force generated when the output electrode is fixed on the mounting base, the space occupied by the mounting base is reduced, and the energy density of the battery is increased.

In some embodiments of the present application, there are gaps among the plurality of battery cells, and the mounting base is configured to be insertable into the gaps.

In the above implementation solution, through the mounting base inserted into the gaps among the plurality of battery cells, on one hand, the internal space of the battery is reasonably utilized, extra space is prevented from being occupied, and the energy density of the battery is increased; and on another hand, the matching surfaces between the mounting base and the plurality of batteries are increased, so that the ability of the battery cell of resisting the torque force generated when the output electrode is fixed on the mounting base can be improved.

In some embodiments of the present application, the mounting base includes a substrate and a connecting piece, the connecting piece being arranged in the substrate, the connecting piece being used to be connected to the output electrode and the connecting piece being located between two battery cells.

In the above implementation solution, the mounting positioning of the mounting base and the battery cell is realized by the substrate, and the connection positioning of the output electrode and the mounting base is realized through the connecting piece; and the connecting piece is located between the two battery cells, so that the mounting space is reasonably utilized and the energy density of the battery is increased.

In some embodiments of the present application, the connecting piece is a nut, the nut is connected to a threaded piece to fix the output electrode on the mounting base.

In the above implementation solution, through the connection between the connecting piece and the threaded piece, assembling and operation are facilitated.

In some embodiments of the present application, a limiting portion is formed on an end face of the mounting base, and the limiting portion is used to be attached to an end part of the battery cell.

In some embodiments of the present application, the limiting portion is attached to the end part of the battery cell, which could limit the movement of the mounting base in a direction perpendicular to the end part of the battery cell, and determine the mounting position of the mounting base.

In some embodiments of the present application, the battery further includes an isolating piece, where the isolating piece is configured to be attached to one side of the limiting portion away from the battery cell.

In the above implementation solution, the isolating piece is attached to the limiting portion to limit the limiting portion between the isolating piece and the end part of the battery cell, which improves the mounting stability of the mounting base and the battery cell, and reduces the risk of the movement of the output electrode.

In some embodiments of the present application, the battery further includes a heating film, the mounting base further includes an avoiding portion, and the heating film is configured to penetrate through the avoiding portion to heat the battery cell.

In the above implementation solution, the battery cell can be heated by the heating film, thereby ensuring the normal work of the battery cell at a relatively low temperature; and the heating film can be avoided by the avoiding portion, thereby ensuring that the heating film heats the battery cell and improving the electrochemical property of the battery cell.

In a second aspect, the present application further provides an electric apparatus, including the above battery.

In a third aspect, the present application further provides a manufacturing method of a battery. The method includes: providing a plurality of battery cells; electrically connecting the plurality of battery cells; providing a mounting base, where the mounting base includes at least one limiting surface, and the limiting surface is matched with the contour of the battery cell; providing an output electrode; electrically connecting the output electrode to the plurality of battery cells, so that the output electrode is capable of exporting electric energy of the plurality of battery cells; and fixing the output electrode on the mounting base.

The additional aspects and the advantages of the present application will be given in the following description part, some of which will become obvious from the following description or be understood through the practice of the present application.

BRIEF DESCRIPTION OF DRAWINGS

To describe the technical solutions in the embodiments of the present application more clearly, the following briefly describes the accompanying drawings required for describing the embodiments. It should be understood that the following accompanying drawings show merely some embodiments of the present application, and therefore should not be regarded as a limitation to the scope. A person of ordinary skill in the art may still derive other related drawings from these accompanying drawings without creative efforts.

Figure 1:
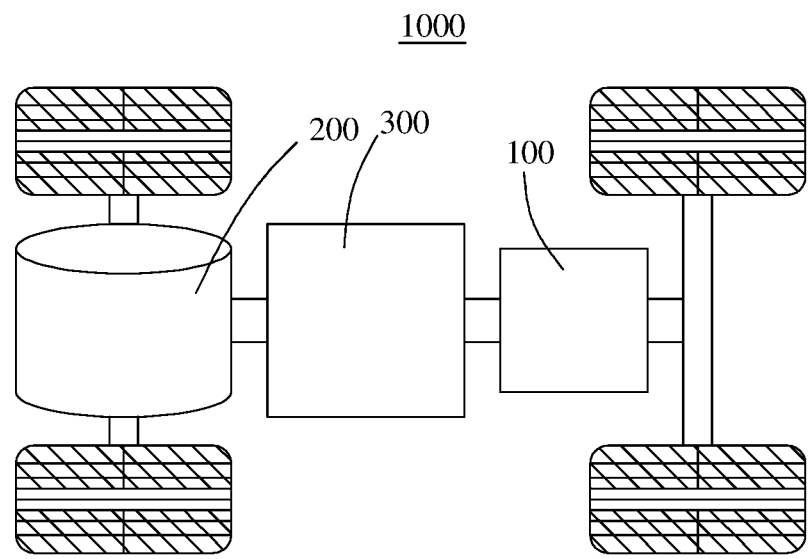
FIG. 1 is a schematic diagram of a vehicle provided by an embodiment of the present application.

In the accompanying drawings, the accompanying drawings are not drawn according to an actual ratio.

Reference numerals: 100—battery; 101—battery module; 110—battery cell; 111—shell; 112—cover plate; 113—electrode terminal; 120—box body; 121—first part; 122—second part; 130—mounting base; 131—substrate; 1311—limiting surface; 1311a—hole; 1313—limiting portion; 1314—through hole; 1315—avoiding portion; 132—connecting piece; 133—supporting arm; 1331—clamping groove; 140—bracket; 150—output electrode; 160—isolating piece;

170—heating film; 171—first avoiding hole; 172—second avoiding hole; 180—outer cover; 200—motor; 300—controller; 1000—vehicle.

DESCRIPTION OF EMBODIMENTS

In order to make the objectives, technical solutions and advantages of the embodiments of the present application clearer, the technical solutions in the embodiments of the present application are described below clearly and completely with reference to the accompanying drawings in the embodiments of the present application. Apparently, the described embodiments are some rather than all of the embodiments. Generally, components of the embodiments of the present application described and shown in the accompanying drawings may be arranged and designed in various different configurations.

Therefore, the following detailed description of the embodiments of the present application in the accompanying drawings is not intended to limit the protection scope of the present application, but merely represent selected embodiments of the present application. All other embodiments obtained by those of ordinary skill in the art based on the embodiments in the present application without creative efforts should fall within the protection scope of the present application.

It should be noted that the embodiments in the present application and features in the embodiments may be combined with each other in a non-conflicting situation. It should be noted that similar reference numerals and letters represent similar items in the accompanying drawings below. Therefore, once an item is defined in one drawing, it does not need to be further defined and described in subsequent drawings.

In the description of the embodiments of the present application, it should be noted that the orientation or position relationship is an orientation or position relationship shown in the drawings, or an orientation or position relationship that a product of the present application is usually placed during use, or an orientation or position relationship that is usually understood by those skilled in the art, which is only for the convenience of describing the present application and simplifying the description, but does not indicate or imply that the referred devices or elements must have a specific orientation and be configured and operated in a specific orientation, so it cannot be understood as a limitation to the present application. In addition, the terms such as "first"", "second", and "third" are used only for the purpose of description and cannot be understood to indicate or imply relative importance.

In the description of the present application, it should also be noted that unless otherwise specified and limited, the terms "set", "mount", "connect" and "connection" should be understood in a broad sense. For example, they may be fixed connection, detachable connection or integrated connection, may be mechanical connection or electric connection, may be direct connection, may also be indirect connection implemented by an intermediate medium, and may be internal communication of two elements. A person of ordinary skill in the art may understand specific meanings of the above-mentioned terms in the present application based on the specific situation.

"A plurality of" in the present application refers to more than two (including two). Similarly, "multiple groups" refers to more than two groups (including two groups).

In the present application, the battery cell may include a lithium ion secondary battery, a lithium ion primary battery, a lithium sulfur battery, a sodium lithium ion battery, a sodium ion battery or a magnesium ion battery. The embodiments of the present application are not limited to this.

The battery mentioned in the embodiments of the present application refers to a single physical module including one or more battery cells to provide higher voltage and capacity. For example, the battery mentioned in the present application may include a battery module or a battery pack. The battery pack includes one or more battery modules, and the battery module includes one or more battery cells. The battery generally further includes a box body for packaging one or more battery cells. The box body may prevent liquid or other foreign matters from affecting charging or discharging of the battery cell.

The battery cell includes an electrode assembly (not shown in the figure) and electrolyte (not shown in the figure, where the electrode assembly consists of a positive plate (not shown in the figure), a negative plate (not shown in the figure) and an isolating membrane (not shown in the figure). The battery cell mainly relies on the movement of metal ions between the positive plate and the negative plate to work. The positive plate includes a positive current collector and a positive active substance layer, where the positive active substance layer is coated on a surface of the positive current collector, the positive current collector uncoated with the positive active substance layer is protruded out of the positive current collector coated with the positive active substance layer, and the positive current collector uncoated with the positive active substance layer serves as a positive tab. Taking a lithium ion battery as an example, a material of the positive current collector may be aluminum, and the positive active substance may be lithium cobaltate, lithium iron phosphate, ternary lithium or lithium manganate. The negative plate includes a negative current collector and a negative active substance layer, where the negative active substance layer is coated on a surface of the negative current collector, the negative current collector uncoated with the negative active substance layer is protruded out of the negative current collector coated with the negative active substance layer, and the negative current collector uncoated with the negative active substance layer serves as a negative tab. A material of the negative current collector may be copper, and the negative active substance may be carbon or silicon. To guarantee that no fusing occurs while a large current passes through, there are a plurality of positive tabs stacked together, and there are a plurality of negative tabs stacked together. A material of the isolating membrane may be PP (polypropylene) or PE (polyethylene), and the like. In addition, the electrode assembly may be of a winding structure, or may also be of a laminated structure. The embodiments of the present application are not limited to this.

The battery further includes a confluence part, and the confluence part is used to realize electric connection between a plurality of battery cells, for example, the plurality of battery cells are connected in parallel or in series or in a mixed manner, where the mixed manner refers to connection in series and in parallel. Specifically, the confluence part may realize electric connection between the plurality of battery cells by connecting electrode terminals of the plurality of battery cells. Among them, the confluence part used to export electric energy of the plurality of battery cells is called an output electrode. The electric energy of the plurality of batter cells may further be led out by a conductive mechanism.

In related art, the battery module generally includes two end plates, and the two end plates are used to tightly press the plurality of battery cells. The output electrode generally needs to be mounted on the mounting base through a bolt to achieve fixation with the output electrode or the conductive structure of other battery modules. The mounting base is generally mounted on the end plate to make the end plate bear a torque force generated when the output electrode is fixed on the mounting base through a bolt, but the mounting base occupies a certain internal space of the battery, thereby affecting the energy density of the battery.

In view of this, the present application provides a technical solution which mounts the mounting base on the battery cell without an end plate, so that the mounting is facilitated, parts are saved, the space occupied by the mounting base is reduced, and the energy density of the battery is increased.

The technical solutions described in the embodiments of the present application are all suitable for various devices using batteries, such as a mobile phone, portable equipment, a notebook computer, an electro-mobile, an electric toy, an electric tool, an electric vehicle, a ship, spacecraft and the like. For example, the spacecraft includes an airplane, a rocket, a space shuttle, a spaceship and the like.

It should be understood that the technical solutions described in the embodiments of the present application are not only suitable for the above device, but also suitable for all devices using the battery. However, for simple description, the following embodiments are described by taking the electric vehicle as an example.

For example, as shown in FIG. 1 which is a structural schematic diagram of a vehicle 1000 in one embodiment of the present application, the vehicle 1000 may be a fuel vehicle, a gas vehicle or a new energy vehicle, where the new energy vehicle may be a battery electric vehicle, a hybrid electric vehicle or an extended-range vehicle. A battery 100 is arranged in the vehicle 1000. For example, the battery 100 may be arranged at the bottom or head or tail of the vehicle 1000. The battery 100 may be used to supply power for the vehicle 1000. For example, the battery 100 may serve as an operating power supply of the vehicle 1000 and may be applied to a circuit system of the vehicle 1000, for example, the battery 100 may be applied to the working electricity demand during starting, navigation and operation of the vehicle. In another embodiment of the present application, the battery 100 may not only serve as an operating power supply of the vehicle 1000, but also as a driving power supply of the vehicle 1000 to replace or partially replace fuel oil or natural gas to provide driving power for the vehicle 1000.

The vehicle 1000 may also be internally provided with a motor and a controller. The controller is used to control the battery 100 to supply power for the motor, for example, for the working electricity demand of the vehicle 1000 during starting, navigating and driving.

In order to meet different electricity demands, the battery 100 may include a plurality of battery cells, where the plurality of battery cells may be connected in series or in parallel or in a mixed manner, and the mixed manner refers to mixing of series and parallel. The battery 100 may also be called a battery pack. In some embodiments, a plurality of battery cells may be connected in series or in parallel or in a mixed manner to form a battery module, and a plurality of battery modules are connected in series or in parallel or in a mixed manner to form a battery 100. That is, the plurality of battery cells may directly form the battery 100, or the plurality of battery cells may also form the battery module firstly and then the battery module forms the battery 100.

Figure 2:
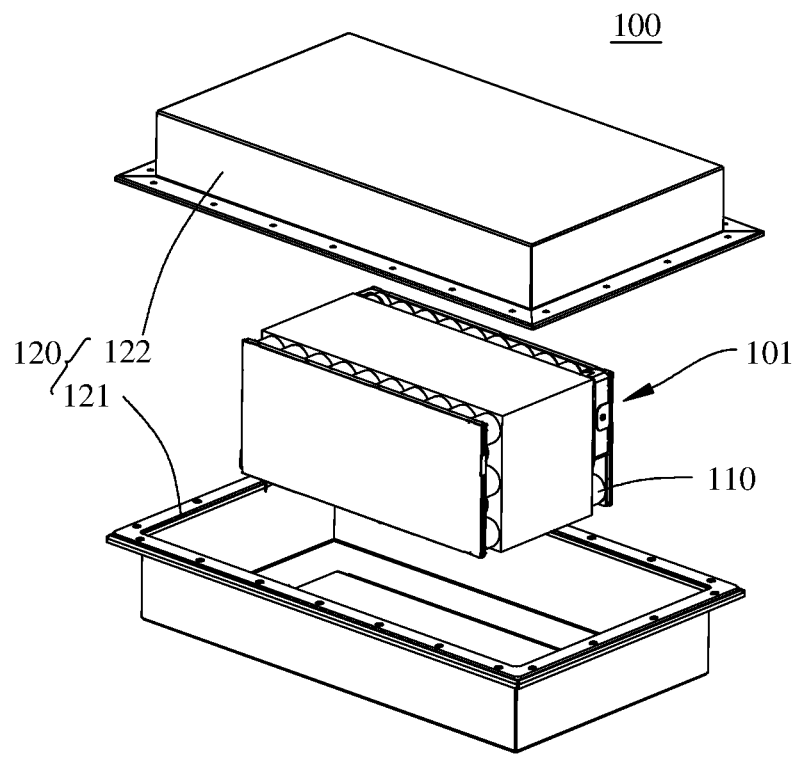
FIG. 2 is an exploded view of a battery provided by an embodiment of the present application.

For example, as shown in FIG. 2 which is a structural schematic diagram of a battery 100 in an embodiment of the present application, the battery 100 may include a plurality of battery cells 110, and the plurality of battery cells 110 are electrically connected. The battery 100 may further include a box body 120, the box body 120 has a hollow structure inside, and the plurality of battery cells 110 are accommodated in the box body 120.

As shown in FIG. 2, the box body 120 may include two parts, which are respectively called a first part 121 and a second part 122, and the first part 121 and the second part 122 are buckled together. The shape of the first part 121 and the second part 122 may be determined according to a combined shape of the plurality of battery cells 110, and each of the first part 121 and the second part 122 may have an opening. For example, each of the first part 121 and the second part 122 may be a hollow cuboid and has only one surface as an open surface, the opening of the first part 121 and the opening of the second part 122 are arranged oppositely, and the first part 121 and the second part 122 are buckled with each other to form a box body 120 with a closed chamber. The plurality of battery cells 110 are mutually combined in parallel or in series or in a mixed manner to be accommodated in the box body 120 formed after the first part 121 and the second part 122 are buckled.

Figure 3:
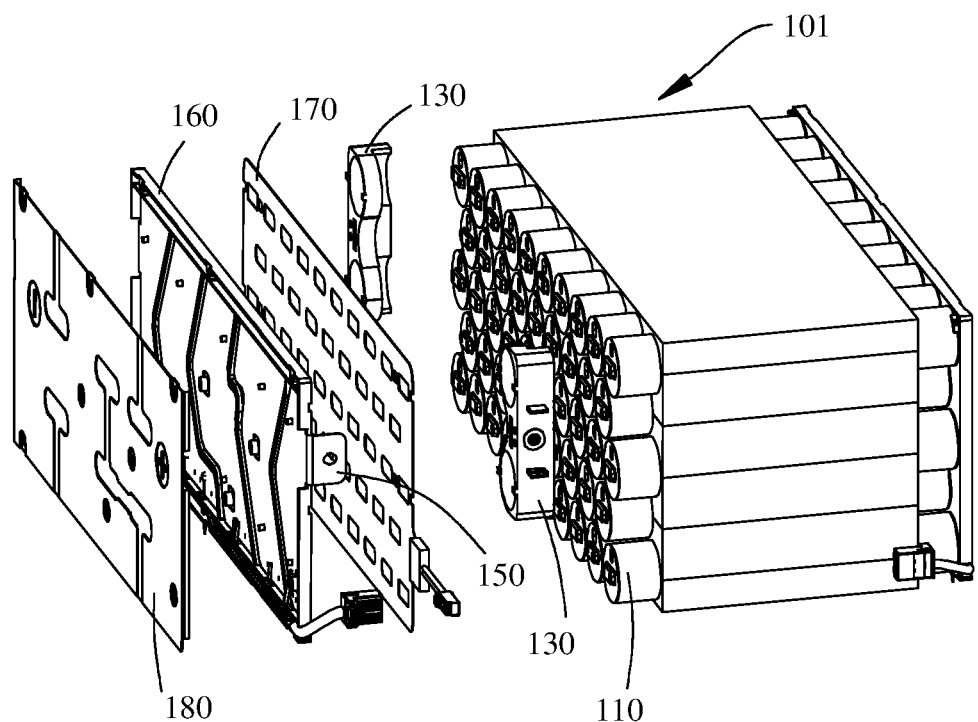
FIG. 3 is an exploded view of a battery module provided by an embodiment of the present application.

According to different electricity demands, the number of the battery cells 110 may be set to any value. The plurality of battery cells 110 may be connected in series, in parallel or in a mixed manner to achieve higher capacity and power. As shown in FIG. 3, it is an exploded view of a battery module provided by an embodiment of the present application. Since the battery 100 may include a relatively large number of battery cells 110, for the convenience of mounting, the battery cells 110 may be arranged in groups. As shown in FIG. 3, each group of battery cells 110 form a battery module 101. The number of the battery cells 110 included in the battery module 101 is not limited and may be set as required. The battery 100 may include a plurality of battery modules 101, and these battery modules 101 may be connected in series or in parallel or in a mixed manner.

Figure 4:
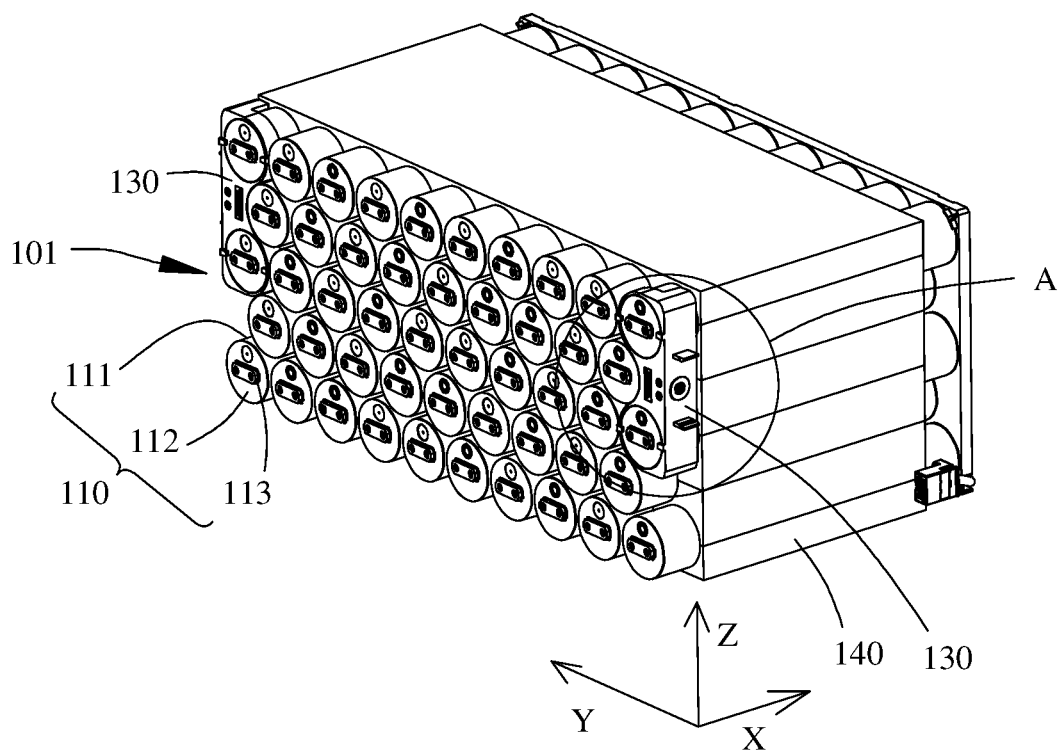
FIG. 4 is an assembling diagram of a mounting base and a battery cell provided by an embodiment of the present application.

As shown in FIG. 4, it is an assembling diagram of a mounting base and a battery cell provided by an embodiment of the present application. The battery cell 110 includes one or more electrode assemblies (not shown in the figure), a shell 111 and a cover plate 112. The shell 111 and the cover plate 112 form an outer shell. A wall of the shell 111 and a wall of the cover plate 112 are both called a wall body of the battery cell 110. The shell 111 is determined according to a shape after one or more electrode assemblies are combined. For example, the shell 111 may be a hollow cuboid, cube or cylinder; and at least one surface of the shell 111 is provided with an opening, so that one or more electrode assemblies may be placed in the shell 111. For example, when the shell 111 is a hollow cuboid or cube, one plane of the shell 111 is an open surface, that is, the plane is not provided with a wall body, so that the inside and outside of the shell communicate with each other; and when the shell 111 is a hollow cylinder, an end face of the shell 111 is an open surface, that is, the end face is not provided with a wall body, so that the inside and outside of the shell 111 communicate with each other. The cover plate 112 covers the opening and is connected to the shell 111 to form a closed cavity for placing the electrode assembly. The shell 111 is filled with electrolyte, such as electrolyte.

The battery cell 110 may further include two electrode terminals 113, and the two electrode terminals 113 may be arranged on the cover plate 112. The cover plate 112 is generally in a flat plate shape, the two electrode terminals 113 are fixed on the flat plate surface of the cover plate 112, and the two electrode terminals 113 are respectively a positive electrode terminal and a negative electrode terminal. Each electrode assembly 113 is correspondingly provided with a connecting component (not shown in the figure), or may be also called a current collecting component, which is located between the cover plate 112 and the electrode assembly and is used to electrically connect the electrode assembly and the electrode terminal 113.

As shown in FIG. 3 and FIG. 4, the battery 100 further includes an output electrode 150 and a mounting base 130. The output electrode 150 is a part for exporting electric energy of a plurality of battery cells 110. The mounting base 130 is configured to be mounted on at least one of the plurality of battery cells 110, for example, the mounting base 130 may be mounted on one battery cell 110, or the mounting base 130 may also be mounted on the plurality of battery cells 110. The mounting base 130 is used to fix the output electrode 150 of the battery 100 so as to ensure the fixed position of the output electrode 150.

The battery 100 may be a battery module. The battery 100 may also be a battery pack, the battery pack includes one or more battery modules 101, and each battery module 101 is provided with two output electrodes 150. The two output electrodes 150 of the battery module 101 are respectively a positive output electrode and a negative output electrode, and the positive output electrode and the negative output electrode may be located on the same side of the battery module 101, or may also be located on two sides of the battery module 101 (as shown in FIG. 4). Correspondingly, each output electrode 150 corresponds to a mounting base 130, or a mounting base 130 may correspond to two output electrodes 150. When the battery 100 includes a plurality of battery module 101, the output electrode 150 is also used to be electrically connected to the adjacent battery module 101, and the output electrode 150 located on the end part of the battery module 101 is used to export the electric energy of the battery 100.

According to the battery 100 in the embodiment of the present application, the mounting base 130 is mounted on the battery cell 110, the battery cell 110 supports the mounting base 130, and bears a torque force generated when the output electrode 150 is mounted by the battery cell 110. On one hand, mounting is facilitated, parts are saved and cost is reduced; and on another hand, the space occupied by the mounting base 130 can be reduced, and the energy density of the battery 100 can be increased.

In some embodiments, as shown in FIG. 4, the plurality of battery cells 110 are fixed integrally through a bracket 140 or glue so as to ensure the compact structure of the battery module 101. When the plurality of battery cells 110 are assembled in a rectangular array, the structure is compact and the energy density of the battery 100 is increased; and the mounting base 130 is located on an end part of an array formed by the plurality of battery cells 110, so the structure space is utilized reasonably.

In some embodiments, there are gaps among the plurality of battery cells 110, and the mounting base 130 is configured to be insertable into the gaps. It may be understood that after the plurality of battery cells 110 are assembled, there is a gap between two adjacent battery cells 110.

Figure 5:
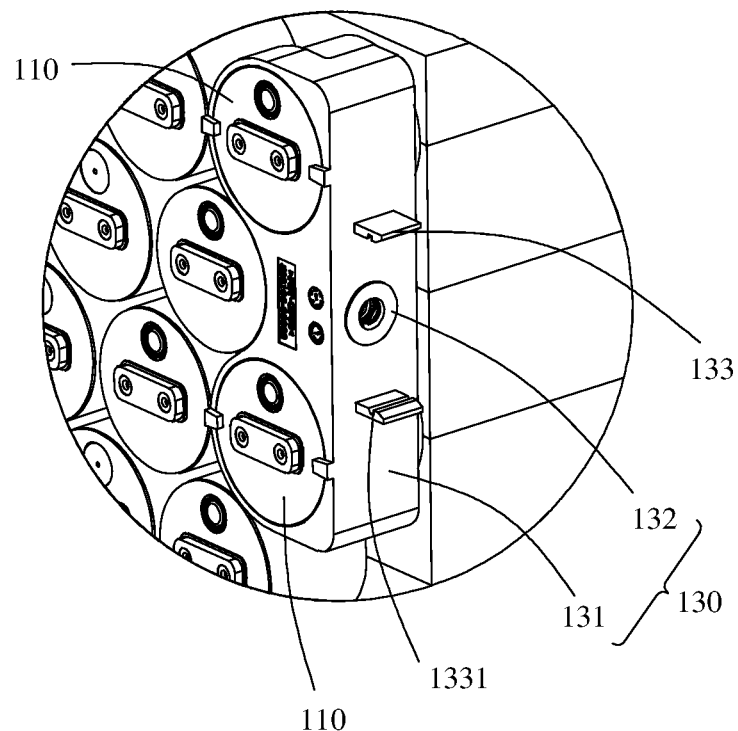
FIG. 5 is an enlarged view of a position A in FIG. 4.

In some embodiments, as shown in FIG. 5 which is an enlarged view of a position A in FIG. 4, the battery cell 110 is a cylindrical battery cell. After the plurality of battery cells 110 are assembled into the battery module 101, due to the contour shape of the cylindrical battery cell, there is a gap between two adjacent battery cells 110. Through the mounting base 130 inserted into the gaps among the plurality of battery cells 110, on one hand, the internal space of the battery 100 is reasonably utilized, extra space is prevented from being occupied, and the energy density of the battery 100 is increased; and on another hand, the matching surfaces between the mounting base 130 and the plurality of battery cells 110 are increased, so that the ability of the battery cell 110 of resisting torque force generated when the output electrode 150 is fixed on the mounting base 130 can be improved. As shown in FIG. 4, X direction is an axis direction of the cylindrical battery cell, a plurality of cylindrical battery cells are distributed in Y direction and Z direction, and there is a gap between two adjacent cylindrical battery cells, where the X direction, the Y direction and the Z direction are perpendicular to each other.

Certainly, it may be understood that when the contour of the battery cell 110 is a cuboid or a cube and there are gaps among the plurality of battery cells 110, the mounting base 130 is inserted into the gaps among the plurality of battery cells 110.

Figure 6:
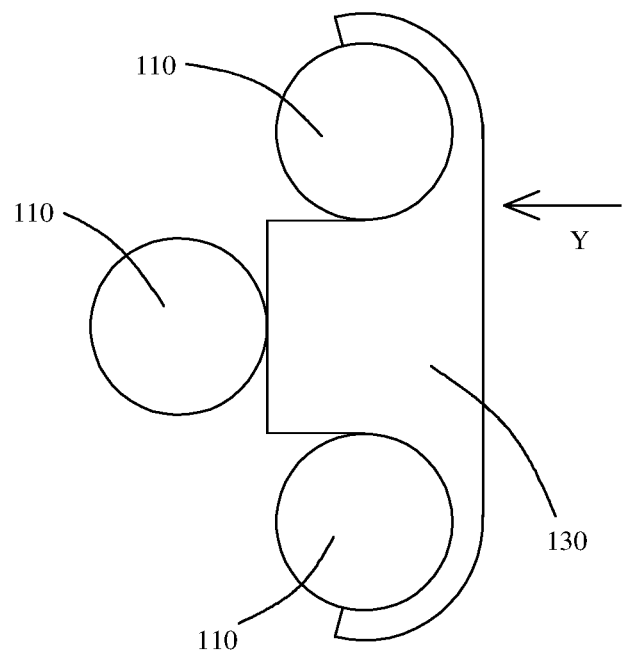
FIG. 6 is an assembling diagram of a mounting base and a battery cell provided by another embodiment of the present application.

In some embodiments, the mounting base 130 may be inserted into the gaps among the plurality of battery cells 110 in different forms. For example, the mounting base 130 may be inserted into the gaps from the end part of the battery cell 110 along an axis direction (X direction shown in FIG. 4) of the battery cell 110. As shown in FIG. 6 which is an assembling schematic diagram of a mounting base 130 and a battery cell 110 provided by another embodiment of the present application, the mounting base 130 may also be inserted into the gaps along a direction (Y direction shown in FIG. 6) perpendicular to the axis direction of the battery cell 110, or the mounting base 130 may be inserted into the gaps along the direction perpendicular to the axis direction of the battery cell 110, and, after partly corresponding to the battery cell 110, then moves to a preset mounting position along the axis direction of the battery cell 110. It should be noted that the axis direction of the battery cell 110 may be understood as a direction perpendicular to the cover plate 112 of the battery 110, that is, the X direction in FIG. 4.

In some embodiments, as shown in FIG. 5, the mounting base 130 includes a substrate 131 and a connecting piece 132, the substrate 131 is used to mount the battery cell 110, and the connecting piece 132 is arranged in the substrate 131. For example, the connecting piece 132 may be embedded into the substrate 131 after the substrate 131 is formed, or the connecting piece 132 may also be pre-embedded in the substrate 131. The connecting piece 132 is used to be connected to the output electrode 150 so as to fix the output electrode 150 on the substrate 131. The connecting piece 132 is located between two battery cells 110 so as to reduce occupied space. The substrate 131 may be an insulating piece, such as plastic (such as PVC (polyvinyl chloride), PE, PP and the like), thereby saving the manufacturing cost; and the connecting piece 132 is a conductive part, such as conductive metal (such as copper, other alloy and the like), which is used to realize electric connection between the output electrode 150 and an output electrode 150 of another battery module 101 or other conductive parts.

In some embodiments, when the mounting base 130 and the cylindrical battery cell are assembled, due to the contour limitation of the cylindrical battery cell, there is a relatively large gap between two adjacent cylindrical battery cells, and the connecting piece 132 is located in the gap, so that the occupied space can be reduced and the energy density can be increased.

In some embodiments, the connecting piece 132 may be a nut. When the output electrode 150 and the mounting base 130 are assembled, the output electrode 150 is connected to the nut through a screw or other threaded pieces, so that the assembling and operating are facilitated, and conductive connection between the output electrode 150 and other parts can be realized. For example, when the output electrode 150 and the mounting base 130 are assembled, the output electrode 150 is fixed to the connecting piece 132 through the threaded piece (screw or bolt) or other like, and the threaded piece is in threaded connection with the connecting piece 132, that is, the output electrode 150 is fixed on the substrate 131 of the mounting base 130 through the threaded piece and the connecting piece 132. Through the cooperating mode of the threaded piece and the connecting piece 132, the assembling and operating are facilitated.

When the output electrode 150 is in conductive connection with other parts (the output electrode 150 of another battery module 101 or other conductive parts) through the matching between the threaded piece and the connecting piece 132, the output electrode 150 and other parts are jointly fixed on the substrate 131 of the mounting base 130, that is, the output electrode 150 and other parts are clamped by the threaded piece and the connecting piece 132, and the output electrode 150 is in conductive connection with other parts. In order to ensure the conductive connection between the output electrode 150 and other parts, the threaded piece and the connecting piece 132 are both made of conductive material.

The output electrode 150 is connected to the connecting piece 132 through the threaded piece, to realize connection between the output electrode 150 and the mounting base 130. Since the mounting base 130 is supported by the battery cell 110, the torque force generated when the output electrode 150 is fixed on the mounting base 130 through the threaded piece is transmitted to the substrate 131 through the connecting piece 132 and is transmitted to the battery cell 110 through the substrate 131, so that the battery cell 110 bears the torque force generated when the output electrode 150 is fixed on the mounting base 130 through the threaded piece.

In some embodiments of the present application, an outer surface of the connecting piece 132 and an outer surface of the substrate 131 are coplanar so as to ensure that the output electrode 150 and the substrate 131 have larger contact area when the output electrode 150 is fixed on the connecting piece 132 through the threaded piece, that is, the substrate 131 has larger supporting area on the output electrode 150.

Figure 7:
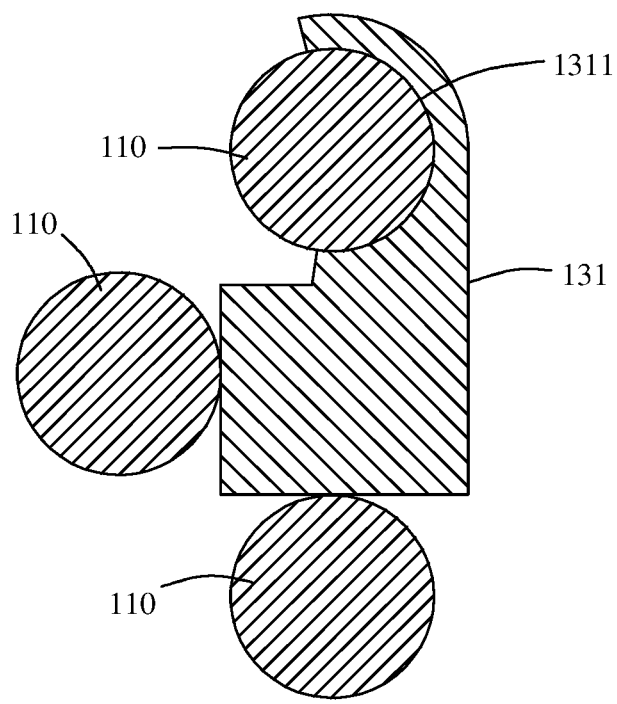
FIG. 7 is an assembling schematic diagram of a limiting surface of a mounting base and a battery cell provided by an embodiment of the present application.

FIG. 7 is an assembling schematic diagram of a limiting surface of a mounting base 130 and a battery cell 110 provided by an embodiment of the present application. In some embodiments, as shown in FIG. 7, the substrate 131 includes at least one limiting surface 1311, and the limiting surface 1311 is matched with the contour of the battery cell 110. It may be understood that the limiting surface 1311 is matched with the contour of a part of the battery cell 110 corresponding to the mounting base 130.

For example, when the battery cell 110 is a cylindrical battery cell, the limiting surface 1311 may be an arc surface, and the limiting surface 1311 is matched with an external peripheral surface of the cylindrical battery cell 110; or when the rough contour of the battery cell 110 is a cuboid or a cube, the limiting surface 1311 may be a plane, and the limiting surface 1311 is matched with an external peripheral surface of the battery cell 110.

The limiting surface 1311 may be attached to the battery cell 110, or there may be a gap between the limiting surface 1311 and the surface of the battery cell 110; and the limiting surface 1311 is used to realize positioning when the mounting base 130 and the battery cell 110 are assembled. Through the matching between the limiting surface 1311 and the battery cell 110, on one hand, the mounting base 130 is mounted on the battery cell 110 conveniently to realize mounting positioning of the mounting base 130 and the battery 110 and limit the displacement of the mounting base 130; and on another hand, space can be saved and the energy density can be increased.

According to different contour shapes of the battery cell 110, the limiting surface 1311 may be a plane, or an arc surface, or further a hole wall of a circular hole.

In order to further facilitate the torque force generated when the output electrode 150 is fixed on the mounting base 130 being applied to the battery cell 110, in FIG. 7, the limiting surface 1311 is attached to the external peripheral surface of the battery cell 110. Since the limiting surface 1311 is matched with the contour of the battery cell 110, the limiting surface 1311 is attached to the external peripheral surface of the battery cell 110, and the displacement of the mounting base 130 can be better limited, so that the battery cell 110 can support the mounting base 130 when the output electrode 150 is connected to the mounting base 130.

In other embodiments, when the mounting base 130 and the battery cell 110 are assembled, at least one limiting surface 1311 may be unconnected with the external peripheral surface of the battery cell 110, that is, there is a gap between the limiting surface 1311 and the battery cell 110, thereby facilitating the mounting navigation of the mounting base 130. There is a movable space between the limiting surface 1311 and the battery cell 110 for adjusting the position of the mounting base 130.

Figure 8:
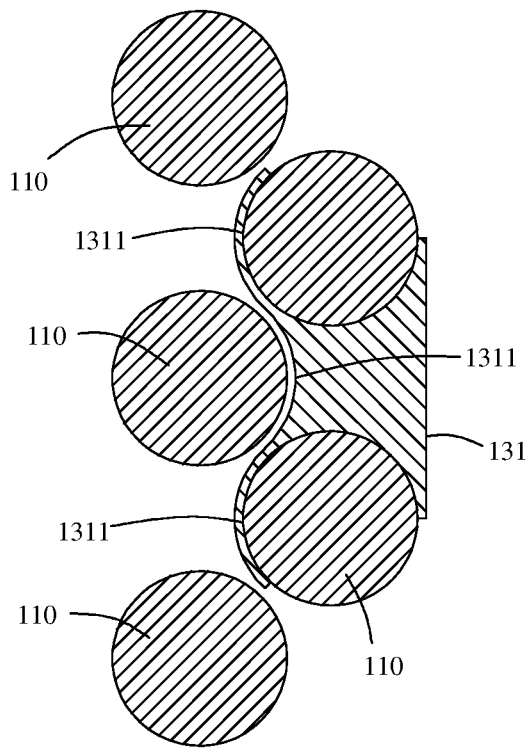
FIG. 8 is an assembling schematic diagram of a limiting surface of a mounting base and a battery cell provided by another embodiment of the present application.
Figure 9:
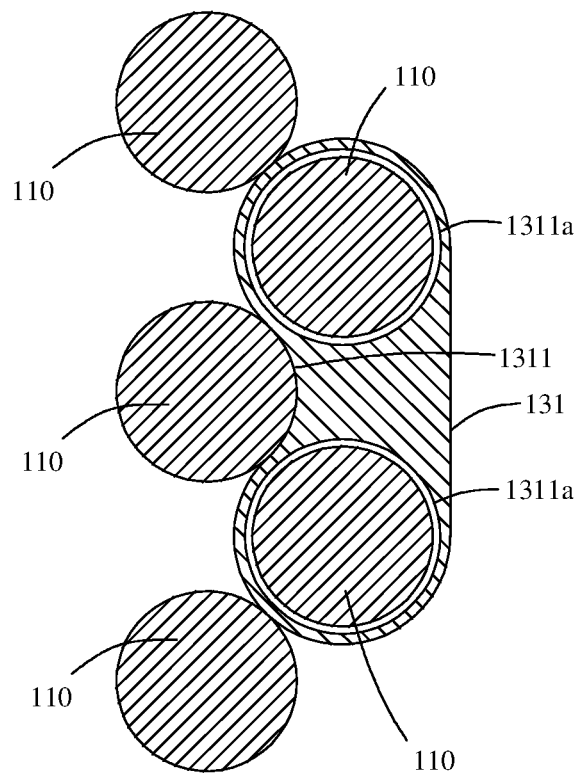
FIG. 9 is an assembling schematic diagram of a limiting surface of a mounting base and a battery cell provided by yet another embodiment of the present application.

For example, FIG. 8 is an assembling schematic diagram of a limiting surface of the mounting base 130 and the battery cell 110 provided by another embodiment of the present application. In FIG. 8, two limiting surfaces 1311 are attached to the external peripheral surfaces of two cylindrical battery cells respectively, and there is a gap between one limiting surface 1311 and the battery cell 110. FIG. 9 is an assembling schematic diagram of a limiting surface of the mounting base 130 and the battery cell 110 provided by yet another embodiment of the present application. In FIG. 9, two holes 1311*a* are sleeved on the external peripheral surfaces of the two battery cells 110 respectively, and there may be a gap between the holes 1311*a* and the corresponding battery cells 110, that is, the limiting surface 1311 includes an inner wall of the hole 1311*a*, and at least part of the inner wall of the hole 1311*a* is not in contact with the external peripheral surface of the battery cell 110. The outer surface of the mounting base 130 may also be provided with a limiting surface 1311 matching with other battery cells 110, which may be attached to the battery cell 110. In the above solution, the position of the mounting base 130 may be limited through a plurality of limiting surfaces 1311 jointly with one battery cell 110 or a plurality of battery cells 110, so that the positioning requirement of the mounting base 130 can be met, and the mounting strength of the mounting base 130 can be improved.

It should be noted that the external peripheral surface of the battery cell 110 refers to a surface of the battery cell 110 matching with the mounting base 130, it could be a surface of a shell 111 of the battery cell 110, or a surface of the shell 111 of the battery cell 110 and a surface of the cover plate 112.

In some embodiments, the substrate 131 includes a plurality of limiting surfaces 1311, and the plurality of limiting surfaces 1311 are used to be attached to the external peripheral surfaces of the plurality of battery cells 110. Through the plurality of limiting surfaces 1311 are attached to the external peripheral surfaces of the plurality of battery cells 110, the mounting positioning surface of the mounting base 130 is increased, the mounting strength of the mounting base 130 is improved, and the torque force generated when the output electrode 150 is mounted on the mounting base 130 can be transmitted to the battery cell 110 more easily.

Figure 10:
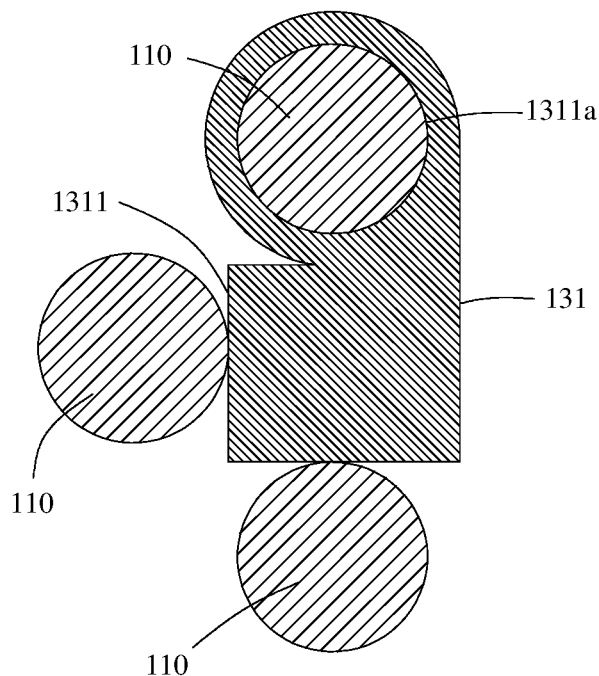
FIG. 10 is a structural schematic diagram of a mounting base provided by an embodiment of the present application.

FIG. 10 is a structural schematic diagram of a mounting base 130 provided by an embodiment of the present application. In some embodiments, the substrate 131 includes a hole 1311*a*. The hole 1311*a* is used to be sleeved on the external peripheral surface of the battery cell 110. There may be one or a plurality of holes 1311*a*. On one hand, the hole 1311*a* is sleeved on the external peripheral surface of the battery cell 110, thereby facilitating the mounting positioning of the mounting base 130; and on another hand, the above solution can make the mounting base 130 transmitting the torque force to the battery cell 110 much easier.

According to different shapes of the battery cells 110, as shown in FIG. 10, when the battery cell 110 is a cylindrical battery cell, the hole 1311*a* may be a circular hole, and a hole wall of the circular hole is a limiting surface 1311; and when the battery cell 110 is a cubic battery cell, the hole 1311*a* may be a square hole, the square hole includes four planes, each plane is a limiting surface 1311. A center line of the hole 1311*a* is parallel to the axis of the battery cell 110. It should be noted that the hole 1311*a* is sleeved on the external peripheral surface of the battery cell 110, which may be understood that the mounting base 130 is sleeved on an outer side of the battery cell 110, the hole may or may not be attached to the external peripheral surface of the battery cell 110.

Figure 11:
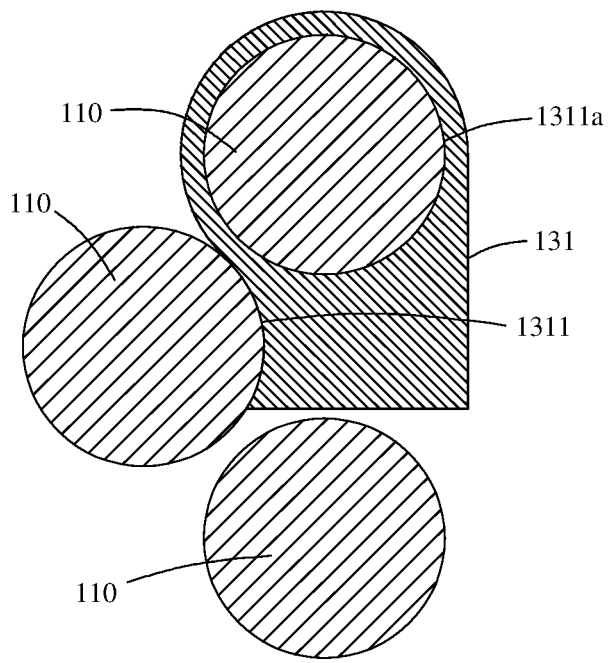
FIG. 11 is a structural schematic diagram of a mounting base provided by another embodiment of the present application.

FIG. 11 is a structural schematic diagram of a mounting base 130 provided by another embodiment of the present application. In some embodiments, as shown in FIG. 10 and FIG. 11, when the battery cell 110 is a cylindrical battery cell and the substrate 131 includes one hole 1311*a*, in order to prevent the mounting base 130 from rotating relative to the battery cell 110, the substrate 131 further includes at least one limiting surface 1311 for being attached to the external peripheral surface of the adjacent battery cell 110, thereby positioning the mounting base 130. When the output electrode 150 is fixed on the mounting base 130 in a direction perpendicular to the axis direction of the battery cell 110, through attaching the limiting surface 1311 to the external peripheral surface of the adjacent battery cell 110 corresponding to the hole 1311*a*, the rotations of the substrate 131 relative to the battery cell 110 can be limited when the output electrode 150 is fixed on the connecting piece 132, and the mounting base 130 transmitting the torque force to the battery cell 110 can be facilitated.

For example, as shown in FIG. 10, the substrate 131 further includes a planar limiting surface 1311, the limiting surface 1311 is attached to the adjacent battery cell 110, by limiting the position of the mounting base 130 through the limiting surface 1311 together with the hole 1311*a*, the positioning support of the battery cell 110 onto the mounting base 130 by the battery cell 110 can be ensured. For example, as shown in FIG. 11, the substrate 131 further includes an arc-shaped limiting surface 1311, the contour of the limiting surface 1311 is matched with the contour of the external peripheral surface of the battery cell 110, the limiting surface 1311 is attached to the external peripheral surface of the adjacent battery cell 110, and the position of the mounting base 130 is limited jointly by the limiting surface 1311 and the hole 1311*a*.

Figure 12:
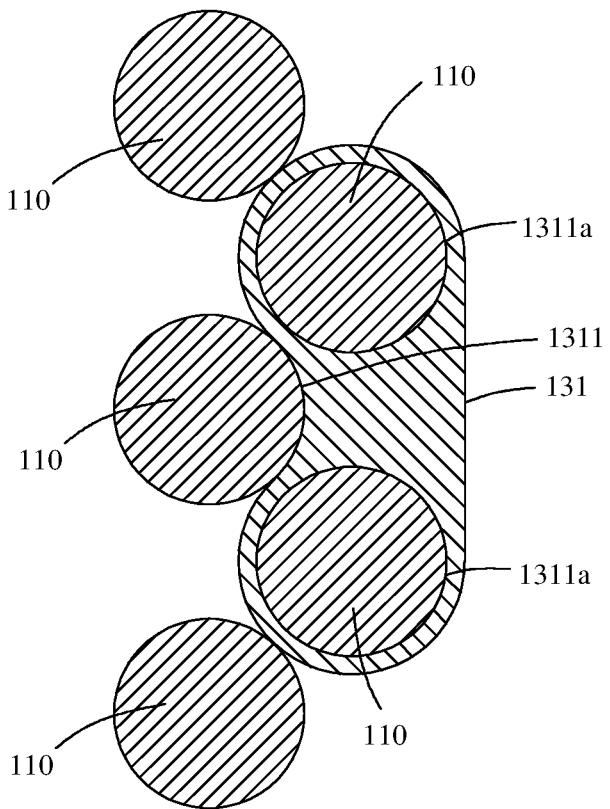
FIG. 12 is a structural schematic diagram of a mounting base provided by yet another embodiment of the present application.

FIG. 12 is a structural schematic diagram of a mounting base 130 provided by yet another embodiment of the present application. In some embodiments, as shown in FIG. 12, the substrate 131 includes two holes 1311*a*, the two holes 1311*a* are used to be respectively sleeved on the external peripheral surfaces of the two battery cells 110, and the two holes 1311*a* jointly limit the position of the mounting base 130. Through the two holes 1311*a* being sleeved on the external peripheral surfaces of the two battery cells 110 respectively, the ability of the battery cell 110 of resisting the torque force generated when the output electrode 150 is fixed on the mounting base 130 can be improved, and meanwhile the rotations of the substrate 131 relative to the battery cell 110 can be limited.

In some embodiments, as shown in FIG. 12, the substrate 131 includes two circular holes 1311*a* which are distributed symmetrically, and the two holes 1311*a* correspond to two cylindrical battery cells 110 respectively. When the substrate 131 is mounted on the battery cells 110, the two holes 1311*a* are respectively sleeved on the external peripheral surfaces of the two battery cells 110, and the hole walls of the holes 1311*a* are attached to the external peripheral surfaces of the battery cells 110. In some embodiments, the two holes 1311*a* correspond to two adjacent battery cells 110 respectively, the connecting piece 132 is located between the two holes 1311*a*, and a geometric center line of the connecting piece 132 is perpendicular to a plane where center lines of the two holes 1311*a* are located. When the output electrode 150 is connected to the connecting piece 132, the substrate 131 is stressed in a balanced manner, and the substrate 131 can be supported by two battery cells 110, which facilitates the battery cells 110 resisting the generated torque force when the output electrode 150 is mounted on the mounting base 130.

As shown in FIG. 12, the substrate 131 may further include an arc-shaped limiting surface 1311, the limiting surface 1311 is located between two circular holes 1311*a*, the limiting surface 1311 is matched with the contour of the battery cell 110, and the limiting surface 1311 is attached to the battery cell 110, so that the battery cell 110 can provide support for the substrate 131 when the output electrode 150 is connected to the connecting piece 132.

Figure 13:
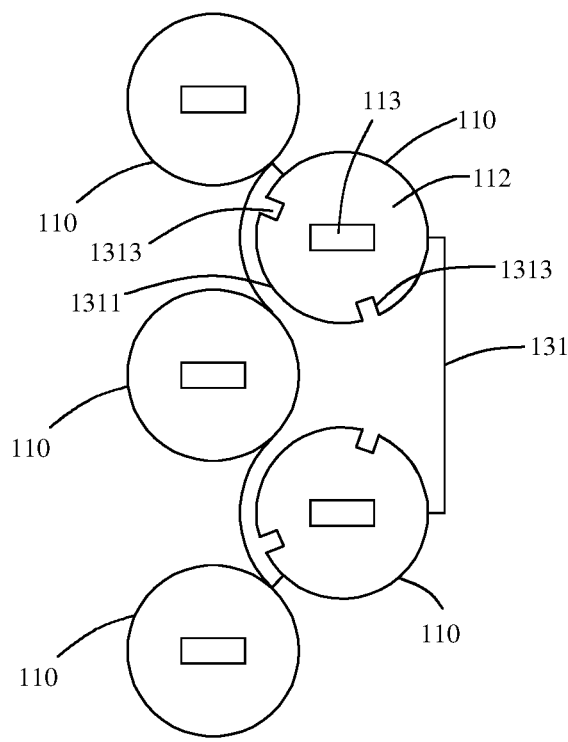
FIG. 13 is an assembling schematic diagram of a limiting portion of a mounting base and a battery cell provided by an embodiment of the present application.

FIG. 13 is an assembling schematic diagram of a limiting portion 1313 of a mounting base 130 and a battery cell 110 provided by an embodiment of the present application. In some embodiments, as shown in FIG. 13, a limiting portion 1313 is formed on an end face of the substrate 131, and the limiting portion 1313 is used to be attached to an end part (a cover plate 112) of the battery cell 110 after the substrate 131 is mounted on the battery cell 110, so that the substrate 131 is limited in the axis direction of the battery cell 110, thereby limiting the further movement of the substrate 131 in the axis direction of the battery cell 110, determining the position of the substrate 131. It should be noted that the end part of the battery cell 110 may be understood as a surface of the cover plate 112 where the electrode terminal 113 is located, and the electrode terminal 113 is located on the end part of the battery cell 110 and is protruded out of the cover plate 112. The end face of the substrate 131 may be understood as an end face of one end of the substrate 131 in the axis direction of the battery cell 110.

In some embodiments, as shown in FIG. 13, the limiting portion 1313 is a bump, and the bump extends in a direction perpendicular to the axis direction of the battery cell 110 and is protruded out of the limiting surface 1311, thereby limiting the further movement of the mounting base 130 relative to the battery cell 110 along the axis direction of the battery cell 110 after the mounting base 130 is mounted on the battery cell 110.

Figure 14:
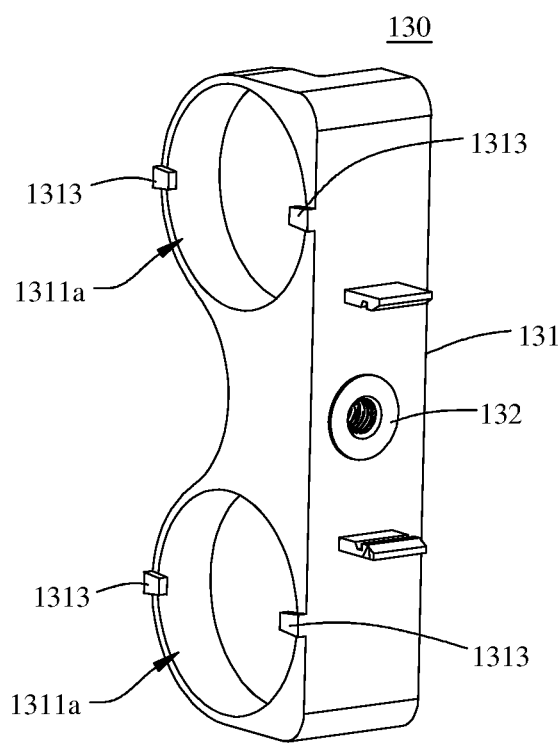
FIG. 14 is a structural schematic diagram of a limiting portion of a mounting base provided by an embodiment of the present application.

In some embodiments, when the mounting base 130 includes a hole 1311a, a plurality of limiting portions 1313 may be arranged in a circumferential direction of the hole 1311a, and the plurality of limiting portions 1313 are in rotational symmetry about a center line of the hole 1311a, thereby ensuring the assembling stability of the mounting base 130 and the battery cell 110. FIG. 14 is a structural schematic diagram of a limiting portion 1313 of a mounting base 130 provided by an embodiment of the present application. As shown in FIG. 14, two limiting portions 1313 are arranged in the circumferential direction of the hole 1311a, and the two limiting portions 1313 are distributed symmetrical about the center line of the hole 1311a.

Figure 15:
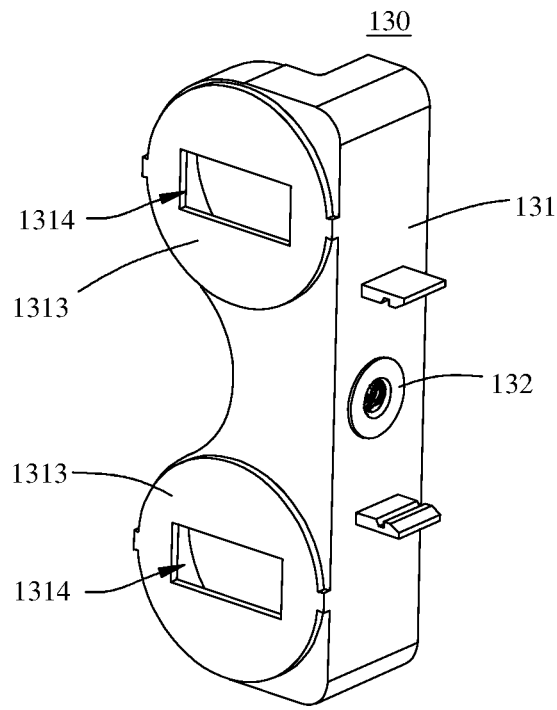
FIG. 15 is a structural schematic diagram of a limiting portion of a mounting base provided by another embodiment of the present application.

FIG. 15 is a structural schematic diagram of a limiting portion 1313 of a mounting base 130 provided by another embodiment of the present application. As shown in FIG. 15, the limiting portion 1313 is of a plate-shaped structure. When the mounting base 130 includes a hole, the limiting portion 1313 covers the hole, and the limiting portion 1313 is provided with a through hole 1314 for exposing the electrode terminal 113. After the mounting base 130 is assembled on the battery cell 110, the limiting portion 1313 is attached to the end part of the battery cell 110, and the electrode terminal 113 is exposed out of the hole, which facilitates the connections between the electrode terminal 113 and electrode terminal 113 of adjacent battery cells 110.

Figure 16:
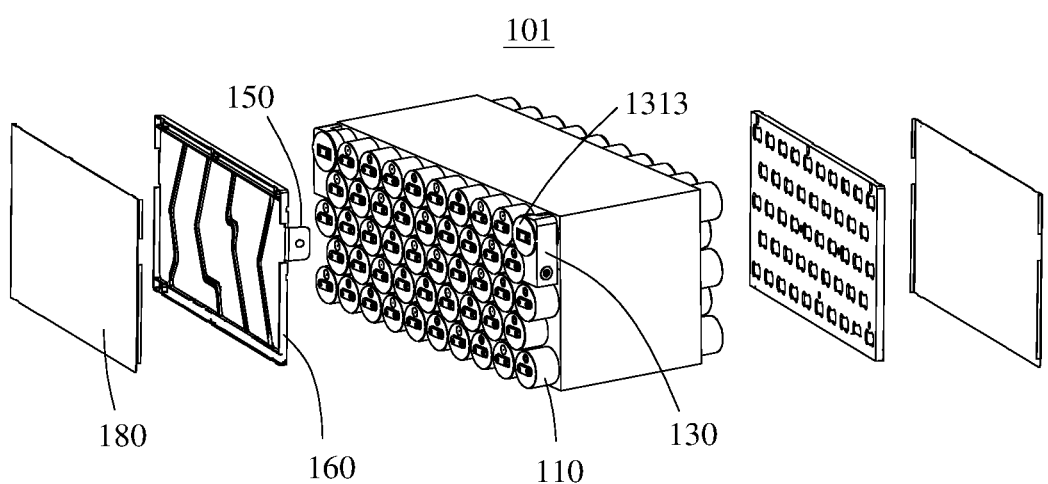
FIG. 16 is an exploded view of a battery module provided by another embodiment of the present application.

FIG. 16 is an exploded view of a battery module 101 provided by another embodiment of the present application. In some embodiments, referring to FIG. 16 and FIG. 3, the battery 100 further includes an isolating piece 160, and the isolating piece 160 may be an insulating piece for isolating the battery cell 110 from other parts (such as a harness); the isolating piece 160 is further used to realize the fixation of the harness (not shown in the figure), a confluence part (not shown in the figure); and when the battery 100 is assembled, the isolating piece 160 can also fix the battery cell 110. The isolating piece 160 is configured to be attached to one side of the limiting portion 1313 away from the battery cell 110. Through attaching the isolating piece 160 to the limiting portion 1313 to limit the limiting portion 1313 between the isolating piece 160 and the end part of the battery cell 110, the mounting stability of the mounting base 130 and the battery cell 110 can be improved, and the risk of movement of the output electrode 150 can be reduced.

In some embodiments, the output electrode 150 is fixed on the isolating piece 160, so that the mounting stability of the output electrode 150 is ensured. In the assembling process of the battery 100, after the isolating piece 160 and the battery cell 110 are assembled, part of the output electrode 150 is located on the outer side of the edge of the isolating piece 160, facilitating the connection between the output electrode 150 and the mounting base 130.

In the working process of the battery 100, the environmental temperature variation can affect the working state of the battery cell 110. When the environmental temperature is relatively low, in order to ensure the normal work of the battery cell 110, the battery cell 110 needs to be heated.

Figure 17:
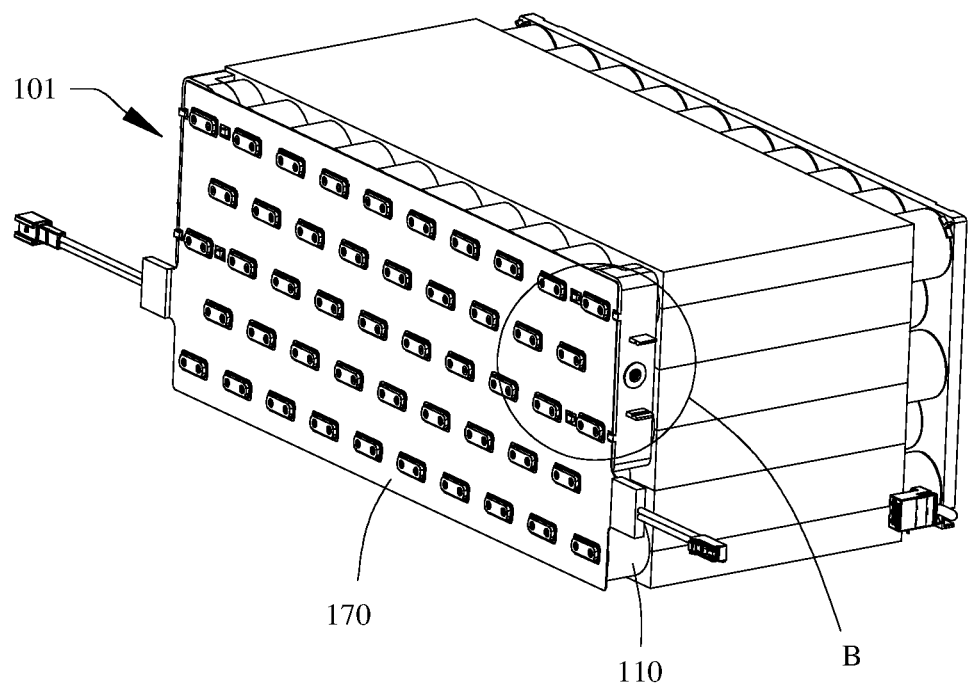
FIG. 17 is a schematic diagram of a heating film of a battery module provided by an embodiment of the present application.
Figure 18:
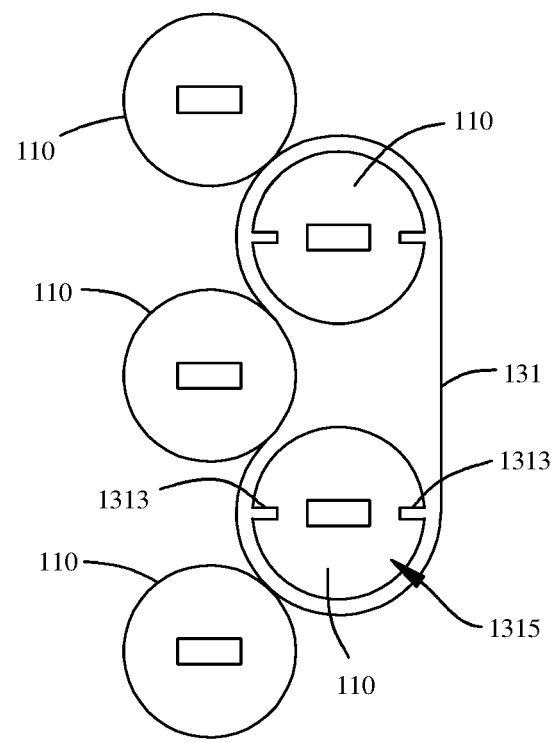
FIG. 18 is a schematic diagram of an avoiding portion of a mounting base provided by an embodiment of the present application.

FIG. 17 is a schematic diagram of a heating film 170 of a battery module 101 provided by an embodiment of the present application; and FIG. 18 is a schematic diagram of an avoiding portion of a mounting base provided by an embodiment of the present application. In some embodiments, as shown in FIG. 17 and FIG. 3, the battery 100 further includes a heating film 170, and the heating film 170 is used to heat the battery cell 110; and as shown in FIG. 18, the mounting base 130 further includes an avoiding portion 1315, and the heating film 170 is configured to penetrate through the avoiding portion 1315 to heat the heating cell 110. Avoidance of the heating film 170 is realized by the avoiding portion 1315, thereby ensuring that the heating film 170 can heat the battery cell 110, ensuring the heating effect and improving the electrochemical properties of the battery cell 110.

In some embodiments, the avoiding portion 1315 may be located on the end part, provided with the limiting portion 1313, of the substrate 131, both the avoiding portion 1315 and the limiting portion 1313 are located on the end face of the substrate 131. It may be understood that the avoiding portion 1315 is a groove, that is, the end face of the substrate 131 is provided with a groove to form the avoiding portion 1315, and the remaining part of the end face forms the limiting portion 1313. The avoiding portion 1315 may also be a peripheral wall of the substrate 131. It may be understood that a groove is formed on the peripheral wall of the substrate 131 to form the avoiding portion 1315, and the heating film 170 penetrates through the avoiding portion 1315 to be in contact with the peripheral wall of the battery cell 110 to heat the battery cell 110.

Figure 19:
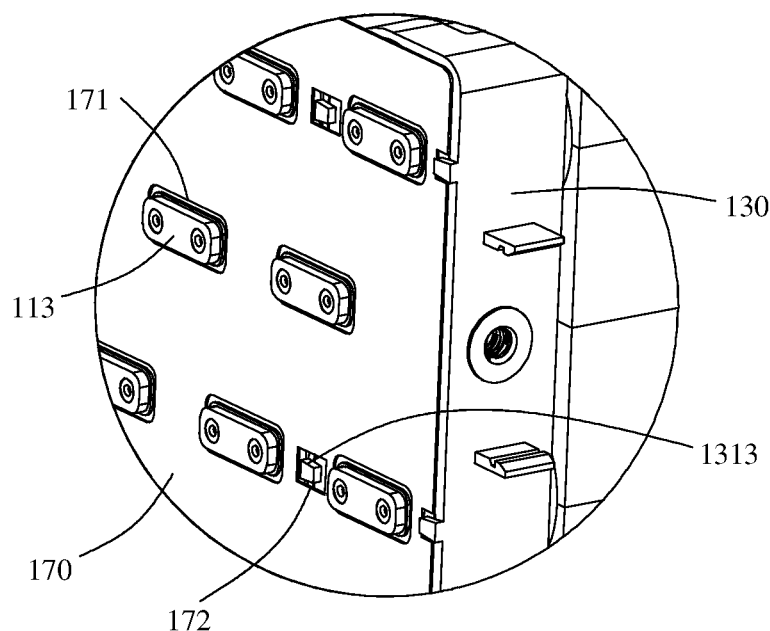
FIG. 19 is an enlarged view of a position B in FIG. 17.

FIG. 19 is an enlarged view of a position B in FIG. 17. In some embodiments, as shown in FIG. 17, the heating film 170 is provided with a first avoiding hole 171 and a second avoiding hole 172, the first avoiding hole 171 is used for the electrode terminal 113 of the battery cell 110 to penetrate through, the second avoiding hole 172 is used for the limiting portion 1313 to penetrate through, and the heating film 170 is used to heat the end part (cover plate 112) of the battery cell 110. After the mounting base 130 is assembled on the battery cell 110, the heating film 170 covers the mounting base 130, and the heating film 170 is attached to the end part of the battery cell 110 to heat the battery cell 110.

As shown in FIG. 3 and FIG. 16, the battery module 101 further includes an outer cover 180, and the outer cover 180 is used to fix the isolating piece 160 on the battery cell 110 to play a role in protecting the isolating piece 160, the harness and the battery cell 110.

As shown in FIG. 5, the battery module 101 further includes a protective cover (not shown in the figure), the substrate 131 of the mounting base 130 is provided with two supporting arms 133, the two supporting arms 133 are symmetrically distributed on two sides of the connecting piece 132, a space between the two supporting arms 133 limits an accommodation space for accommodating the protective cover, a clamping groove 1331 matched with the protective cover is formed on each supporting arm 133, the protective cover is configured to be buckled with the clamping groove 1331, and the protective cover is used to protect and isolate the output electrode.

An embodiment of the present application further provides an electric apparatus. The electric apparatus may include the battery cell 100 in the foregoing embodiments. Optionally, the electric apparatus may be a vehicle 1000, a ship or spacecraft.

The battery 100 and the electric apparatus in the embodiments of the present application are described above. A manufacturing method of the battery 100 according to the embodiments of the present application will be described below. The parts which are not described in detail may be referenced to the foregoing embodiments.

Figure 20:
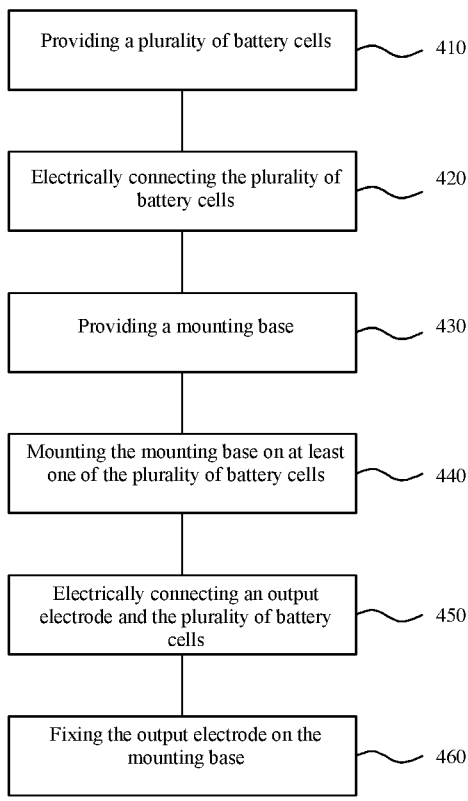
FIG. 20 is a schematic flowchart of a manufacturing method of a battery provided by an embodiment of the present application.

FIG. 20 is a schematic flowchart of a manufacturing method of a battery 100 provided by an embodiment of the present application. As shown in FIG. 20, the method may include: 410, providing a plurality of battery cells 110; 420, electrically connecting the plurality of battery cells 110; 430, providing a mounting base 130; 440, mounting the mounting base 130 on at least one of the plurality of battery cells 110; 450, electrically connecting an output electrode 150 and the plurality of battery cells 110, so that the output electrode 150 can export electric energy of the plurality of battery cells 110; and 460, fixing the output electrode 150 on the mounting base 130.

Figure 21:
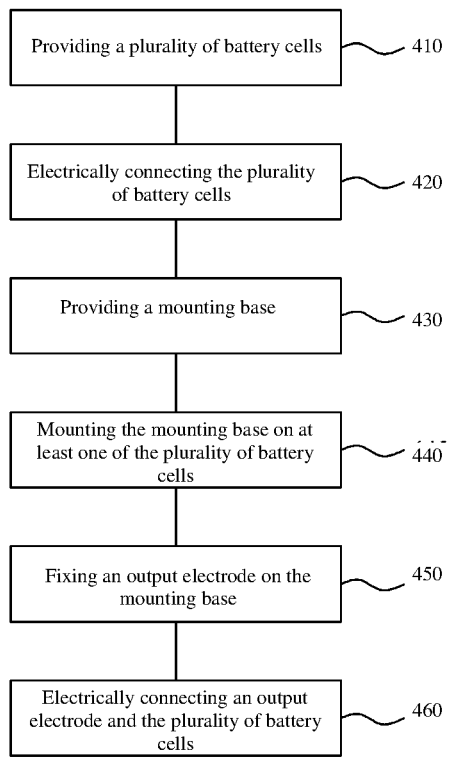
FIG. 21 is a schematic flowchart of a manufacturing method of a battery provided by another embodiment of the present application.

It should be noted that the sequence of the step "electrically connecting the output electrode 150 and the plurality of battery cells 110" and the step "fixing the output electrode 150 on the mounting base 130" may be interchangeable. For example, FIG. 21 shows a schematic flowchart of a manufacturing method of a battery 100 provided by another embodiment of the present application. The method may include: 410, providing a plurality of battery cells 110; 420, electrically connecting the plurality of battery cells 110; 430, providing a mounting base 130; 440, mounting the mounting base 130 on at least one of the plurality of battery cells 110; 450, fixing the output electrode 150 on the mounting base 130; and 460, electrically connecting the output electrode 150 and the plurality of battery cells 110, so that the output electrode 150 can export electric energy of the plurality of battery cells 110.

Figure 22:
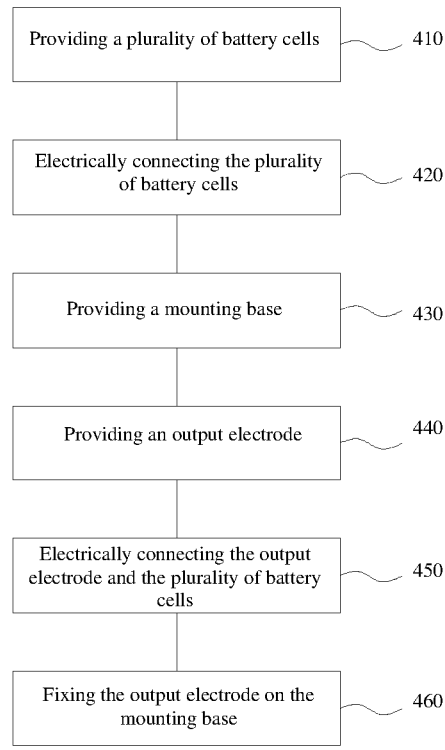
FIG. 22 is a schematic flowchart of a manufacturing method of a battery provided by yet another embodiment of the present application.

FIG. 22 is a schematic flowchart of a manufacturing method of a battery 100 provided by yet another embodiment of the present application. As shown in FIG. 22, the method may include: 410, providing a plurality of battery cells 110; 420, electrically connecting the plurality of battery cells 110; 430, providing a mounting base 130, where the mounting base 130 includes at least one limiting surface 1311, and the limiting surface 1311 is matched with the contour of the battery cell 110; 440, providing an output electrode 150; 450, electrically connecting the output electrode 150 and the plurality of battery cells 110, so that the output electrode 150 can export electric energy of the plurality of battery cells 110; and 460, fixing the output electrode 150 on the mounting base 130.

It should be noted that the features in the embodiments of the present application may be combined with each other in a non-conflicting situation.

The above are only preferred embodiments of the application, and are not used to limit the application. For those skilled in the art, the application can have various modifications and changes. Any modifications, equivalent substitutions, improvements, and the like within the spirit and principles of the present application are intended to be included within the protection scope of the present application.

What is claimed is:

1. A battery, comprising:
   a plurality of battery cells, the plurality of battery cells being electrically connected;
   an output electrode, used to export electric energy of the plurality of battery cells; and
   a mounting base, used to fix the output electrode of the battery, the mounting base comprising at least one limiting surface, and the limiting surface being matched with the contour of a corresponding battery cell in the plurality of battery cells;
   wherein the mounting base comprises a substrate and a connecting piece, the connecting piece being arranged in the substrate, the connecting piece being used to be connected to the output electrode.

2. The battery according to claim 1, wherein the limiting surface is used to be attached to an external peripheral surface of the battery cell.

3. The battery according to claim 1, wherein the mounting base comprises a plurality of limiting surfaces, and the plurality of limiting surfaces are used to be attached to external peripheral surfaces of the plurality of battery cells.

4. The battery according to claim 1, wherein the mounting base comprises a hole, and the hole is used to be sleeved on an external peripheral surface of the battery cell.

5. The battery according to claim 4, wherein the mounting base comprises two holes, and the two holes are used to be sleeved on the external peripheral surfaces of two battery cells in the plurality of battery cells respectively.

6. The battery according to claim 1, wherein the mounting base is configured to be mounted on at least one of the plurality of battery cells.

7. The battery according to claim 1, wherein there are gaps among the plurality of battery cells, and the mounting base is configured to be insertable into the gaps.

8. The battery according to claim 1, wherein the connecting piece is located between two battery cells in the plurality of battery cells.

9. The battery according to claim 1, wherein the connecting piece is a nut, and the nut is connected to a threaded piece to fix the output electrode on the mounting base.

10. The battery according to claim 1, wherein a limiting portion is formed on an end face of the mounting base, and the limiting portion is used to be attached to an end part of the battery cell.

11. The battery according to claim 10, the battery further comprising an isolating piece, wherein the isolating piece is configured to be attached to one side of the limiting portion away from the battery cell.

12. The battery according to claim 10, the battery further comprising a heating film, wherein the mounting base further comprises an avoiding portion, and the heating film is configured to penetrate through the avoiding portion to heat the battery cell.

13. An electric apparatus, comprising the battery as defined in claim 1.

14. A manufacturing method of a battery, the method comprising:
   providing a plurality of battery cells;
   electrically connecting the plurality of battery cells;
   providing a mounting base, wherein the mounting base comprises at least one limiting surface, and the limiting surface is matched with the contour of a corresponding battery cell in the plurality of battery cells;
   providing an output electrode;
   electrically connecting the output electrode to the plurality of battery cells, so that the output electrode is capable of exporting electric energy of the plurality of battery cells; and
   fixing the output electrode on the mounting base;
   wherein the mounting base comprises a substrate and a connecting piece, the connecting piece being arranged in the substrate, the connecting piece being used to be connected to the output electrode.

* * * * *